United States Patent

Ho et al.

[11] Patent Number: 5,815,803
[45] Date of Patent: Sep. 29, 1998

[54] WIDEBAND HIGH ISOLATION CIRCULATIOR NETWORK

[75] Inventors: Thinh Q. Ho, Anaheim; Stephen M. Hart, San Diego; Gregory A. Kosinovsky, San Diego; Willard I. Henry, San Diego, all of Calif.

[73] Assignee: The United States of America as represented by the Secretary of the Navy, Washington, D.C.

[21] Appl. No.: 614,782

[22] Filed: Mar. 8, 1996

[51] Int. Cl.$^6$ ........................................................ H04B 1/44
[52] U.S. Cl. ................................. 455/78; 455/82; 455/83; 333/1.1
[58] Field of Search .................................. 455/78, 82, 83, 455/84; 333/1.1, 24.2, 117; 370/281

[56] References Cited

U.S. PATENT DOCUMENTS

| | | |
|---|---|---|
| 3,132,339 | 5/1964 | Boughnou . |
| 3,696,429 | 10/1972 | Tressa . |
| 3,810,182 | 5/1974 | White et al. . |
| 4,475,243 | 10/1984 | Batlivala et al. . |
| 4,641,365 | 2/1987 | Montini, Jr. ............................. 455/83 |
| 4,660,042 | 4/1987 | Ekstrom . |
| 5,444,864 | 8/1995 | Smith . |
| 5,701,595 | 5/1995 | Green, Jr. ................................... 455/83 |

*Primary Examiner*—Nguyen Vo
*Assistant Examiner*—Edan Orgad
*Attorney, Agent, or Firm*—Harvey Fendelman; Michael A. Kagan; Peter A. Lipovsky

[57] ABSTRACT

An isolation circulator network includes three circulators and a 180 degree hybrid coupler for isolating an RF transmitter from a nearby RF receiver. The isolation circulator network comprises: a first circulator for transforming a first RF signal, $RF_1$, into a second RF signal, $RF_2$ and a third RF signal, $RF_3$; a second circulator for throughputting the third RF signal; a third circulator for transforming the second RF signal into a fourth RF signal, $RF_4$, and a fifth RF signal, $RF_5$, and for throughputting a sixth RF signal, $RF_6$; and a 180-degree hybrid coupler which provides a seventh RF signal, $RF_7$ in response to receiving the third, fifth, and sixth RF signals, where $RF_7=(RF_5-RF_3+RF_6)$.

8 Claims, 2 Drawing Sheets

WIDEBAND HIGH ISOLATION CIRCULATIOR NETWORK

BACKGROUND OF THE INVENTION

The present invention generally relates to radio communications systems in which it desirable to eliminate interference in receiver signals from adjacent transmitters.

There are many applications for radio communications systems in which receivers must be operated near transmitters, all at the same frequency. Such systems may be found onboard aircraft or ships. A problem arises when a strong signal transmitted by a nearby receiver overwhelms a weaker signal intended to be detected by the receiver, thereby reducing the sensitivity of the receiver. A need therefore exists for a simple system for isolating a transmitter from a nearby receiver by a sufficient amount to allow detection of a signal of interest.

Summary of the Invention

The present invention provides a high isolation circulator network which includes three circulators and a 180 degree hybrid coupler for isolating an RF transmitter from a nearby RF receiver. The high isolation circulator network comprises: a first circulator for transforming a first RF signal, $RF_1$, into a minimally attenuated second RF signal, $RF_2$ and an attenuated third RF signal, $RF_3$; a second circulator for transforming the third RF signal with minimal attenuation; a third circulator for transforming the second RF signal into a fourth RF signal, $RF_4$, with minimal attenuation and an attenuated fifth RF signal, $RF_5$. The second circulator also transforms a receiving signal, $RF_6$, into a minimally attenuated signal, $RF_6$. A 180-degree hybrid coupler provides a seventh RF signal, $RF_7$ in response to receiving the third, fifth, and sixth RF signals, where $RF_7=(RF_5-RF_3+RF_6)$. An important advantage of the invention is that it provides a simple solution for the long sought goal of obtaining excellent isolation between a transmitter and a nearby receiver.

DESCRIPTION OF THE PREFERRED EMBODIMENTS

Figure 1:
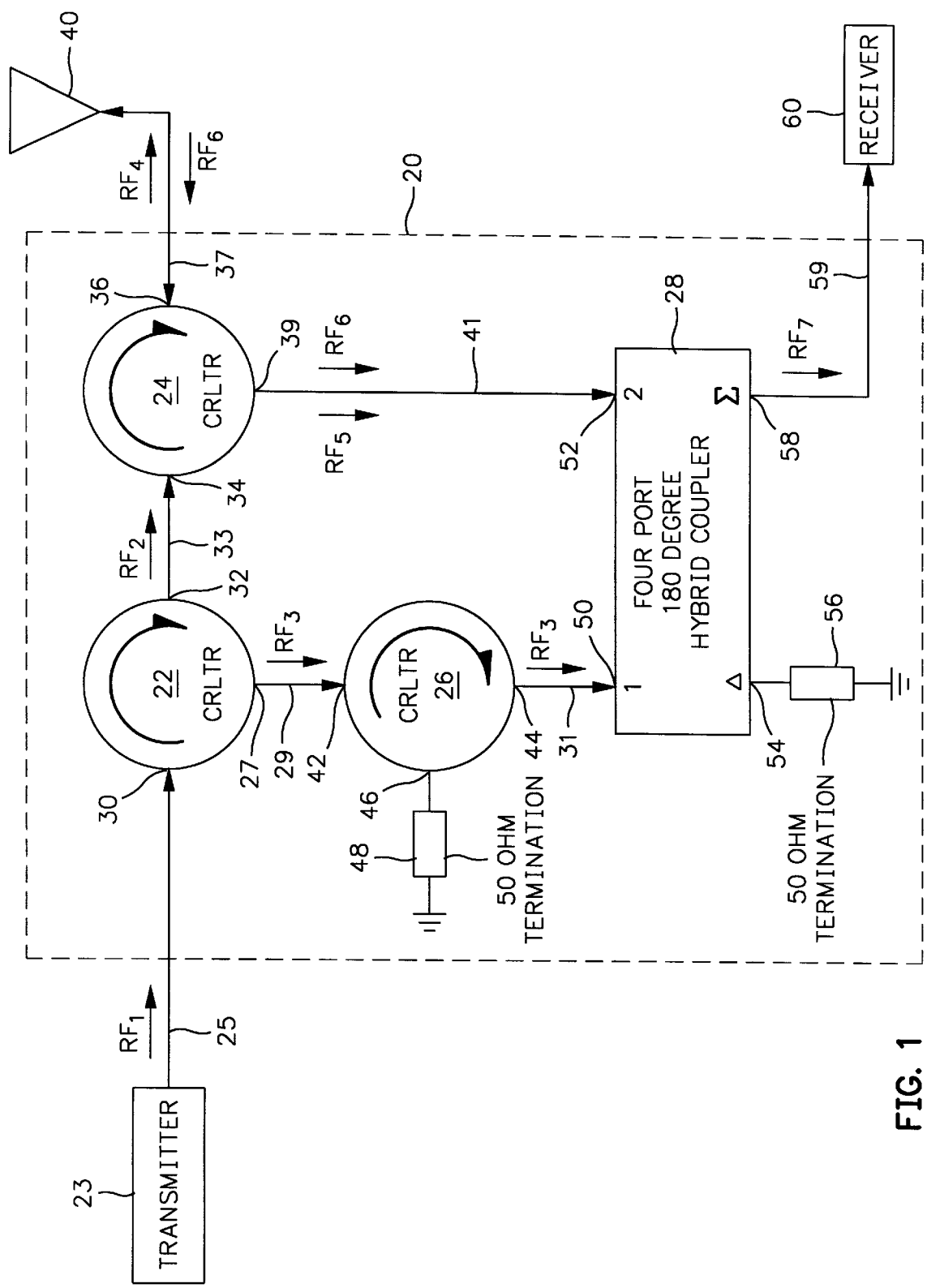
FIG. 1 is a block diagram of a high isolation circulator network embodying various features of the present invention.

Referring to FIG. 1, there is shown a high isolation circulator network 20 embodying various features of the present invention. The network includes three matched circulators interconnected with a four port, 180-degree hybrid coupler to provide very high isolation between a strong radio frequency (RF) signal generated by a transmitter and a much weaker RF signal intended to be detected by a receiver near the transmitter. A circulator is a device with ports arranged so that RF energy entering a port is coupled in one direction to an adjacent port, but not coupled to the other port(s). A hybrid coupler is a reciprocal, four-port device which provides two equal amplitude, in-phase signals when fed from its sum port, and two equal amplitude, 180 degree out-of-phase signals when fed from its difference ports. Opposite ports of a hybrid coupler are isolated.

RF (radio frequency) signal $RF_1$, generated by transmitter 23, is directed along propagation path 25 to input port 30 of circulator 22. Circulator 22 transforms the power of signal $RF_1$ into signals $RF_2$ and $RF_3$. Signal $RF_2$ exits port 32 of circulator 22 with minimal insertion loss (attenuation) compared to signal $RF_1$. Signal $RF_2$ is directed along propagation path 33 and is received through port 34 of circulator 24. Although ports 30 and 27 of circulator 22 are not completely isolated, signal $RF_3$ is greatly attenuated compared to signal $RF_1$ as it exits port 27 of circulator 22

Circulator 24 transforms the power of signal $RF_2$ into signals $RF_4$ and $RF_5$. Signal $RF_4$ is output with minimal insertion loss through port 36. Next, signal $RF_4$ is directed along propagation path 37 to antenna 40 from which signal $RF_4$ is transmitted. Ports 34 and 39 of circulator 24 are not completely isolated. Therefore, $RF_5$ is greatly attenuated compared to signal $RF_2$ as it exits port 39 of circulator 24 and travels along propagation path 41 to input port 52 of hybrid coupler 28.

Signal $RF_3$ is directed through propagation path 29 to input port 42 of circulator 26 and exits with minimal insertion loss through port 44. Hybrid coupler 28 receives signal $RF_3$ through input port 50. Port 46 of circulator 26 is terminated by RF load 48, which may for example, have an impedance of 50 ohms, to inhibit any significant RF power leakage through port 46 of circulator 26.

Signal $RF_6$, having a different frequency from signal $RF_1$, is detected by antenna 40 and directed along propagation path 37 to port 36 of circulator 24. Signal $RF_6$ then is output through port 39 of circulator 24 with minimal insertion loss. Signals $RF_5$ and $RF_6$ are directed along propagation path 41 to input port 52 of hybrid coupler 28. Thus, it may be appreciated that signals $RF_5$ and $RF_6$ are superimposed along propagation path 41.

A very important aspect of the operation of circulator network 20 is that the RF propagation path lengths between the transmitter 23 and input port 50 of hybrid coupler 28 is equal to that between the transmitter and port 52 of the coupler 28. One of the propagation path lengths is defined by propagation path 25, circulator 22, propagation path 33, circulator 24, and propagation path 41. The other propagation path length is defined by propagation path 25, circulator 22, propagation path 29, circulator 26, and propagation path 31. Moreover, the attenuation of the RF signals that propagate along the propagation path lengths are equal. Therefore, signals $RF_3$ and signal $RF_5$ presented at ports 50 and 52, respectively, of hybrid coupler 28 have essentially the same amplitude and a zero phase difference between them.

Hybrid coupler 28 further includes a difference port 54 and a summation port 58. Sum port 54 is grounded through RF load 56, having for example, an impedance of about 50 ohms. Difference port 58 provides an output signal $RF_7$ which is directed along propagation path 59 to an RF receiver 60, where $RF_7=(RF_5-RF_3+RF_6)$. Since the vector difference between signals $RF_3$ and $RF_5$ is practically zero, $RF_7$ is essentially equivalent to signal $RF_6$ with perhaps about −3 db of insertion loss due to power splitting by the hybrid coupler 28.

Propagation paths 25, 29, 33, 37, 29, 31, and 41 may be implemented as micro strips, coaxial line, or waveguides, or any combination of them.

In one particular embodiment of the circulator network 20, the circulators 22, 24, and 26 were each implemented as Tekelec Microwave Part No. BB3007 00 which provided over 50 db of RF isolation, and the coupler 28 was implemented as Merrimac Industries Part No. HJN-312.5/74039. In this embodiment, the difference between signals $RF_1$ and $RF_3$ provided by circulator 22 was greater than 50 db.

Figure 2:
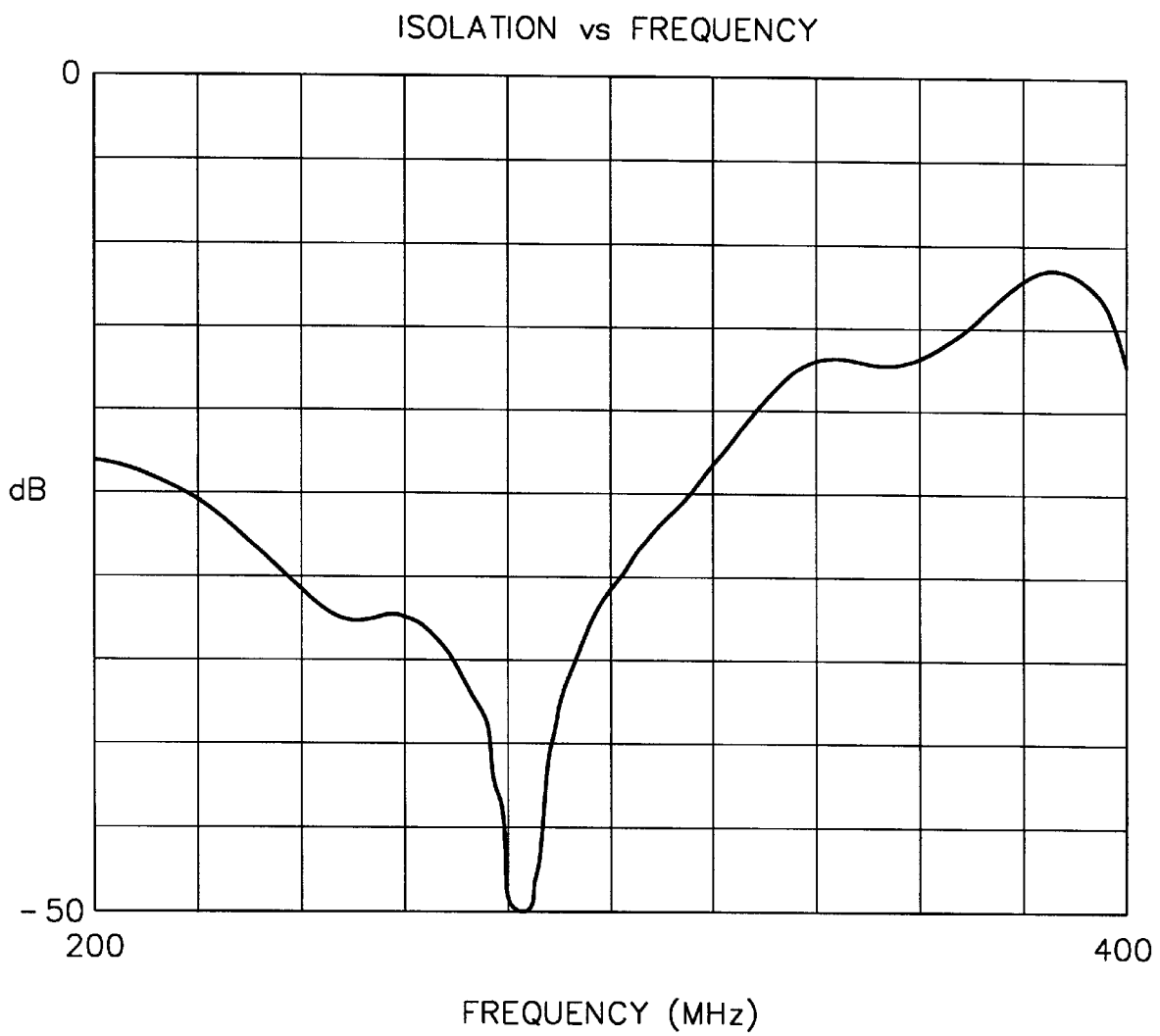
FIG. 2 is a graph showing the relation between isolation versus frequency of one embodiment of the network of FIG. 1.

Similarly, the difference between signals $RF_2$ and $RF_5$ provided by circulator 24 was also greater than 50 db. FIG. 2 illustrates the relation between the isolation of transmitted signal $RF_1$ and a received signal $RF_6$ as a function of frequency for such implementation. As can be seen, at a frequency of about 200–500 MHz, there is almost total isolation between signals $RF_3$, and hence $RF_1$, and $RF_7$, the signal received by receiver 60.

Obviously, many modifications and variations of the present invention are possible in light of the above teachings. Therefore, it is to be understood that within the scope of the appended claims, the invention may be practiced otherwise than as specifically described.

We claim:

1. An isolation circulator network, comprising:
   a first circulator for transforming a first RF signal, $RF_1$, into a second RF signal, $RF_2$ and a third RF signal, $RF_3$;
   a second circulator for throughputting said third RF signal;
   a third circulator for transforming said second RF signal into a fourth RF signal, $RF_4$, and a fifth RF signal, $RF_5$, and for through putting a sixth RF signal, $RF_6$;
   a 180-degree hybrid coupler which provides a seventh RF signal, $RF_7$ in response to receiving said third, fifth, and sixth RF signals, where $RF_7=(RF_5-RF_3+RF_6)$.

2. The isolation circulator network of claim 1 further including an RF transmitter for providing said first RF signal to said first circulator.

3. The isolation circulator network of claim 1 further including an RF receiver RF for receiving said seventh RF signal.

4. The isolation circulator network of claim 1 further including an antenna for detecting and providing said sixth RF signal to third circulator.

5. The isolation circulator network of claim 1 further including an RF transmitter for providing said first RF signal to said first circulator, an antenna for detecting and providing said sixth RF signal to said third circulator and for transmitting said fourth RF signal, and an RF receiver for receiving said seventh RF signal.

6. The isolation circulator network of claim 1 further including micro strips for interconnecting said first, second and third circulators, and said hybrid coupler.

7. The isolation circulator network of claim 1 further including coaxial line for interconnecting said first, second and third circulators, and said hybrid coupler.

8. The isolation circulator network of claim 1 further including waveguides for interconnecting said first, second and third circulators, and said hybrid coupler.

* * * * *